US012607306B2

(12) United States Patent
Knaub

(10) Patent No.: US 12,607,306 B2
(45) Date of Patent: Apr. 21, 2026

(54) SLIDING VESSEL MOUNT

(71) Applicant: Hexagon Purus Germany Holding GmbH, Kassel (DE)

(72) Inventor: Alex Knaub, Kassel (DE)

(73) Assignee: Hexagon Purus Germany Holding GmbH, Kassel (DE)

( * ) Notice: Subject to any disclaimer, the term of this patent is extended or adjusted under 35 U.S.C. 154(b) by 30 days.

(21) Appl. No.: 18/636,543

(22) Filed: Apr. 16, 2024

(65) Prior Publication Data

US 2024/0418327 A1 Dec. 19, 2024

Related U.S. Application Data

(60) Provisional application No. 63/508,325, filed on Jun. 15, 2023.

(51) Int. Cl.
*F17C 13/08* (2006.01)

(52) U.S. Cl.
CPC ...... *F17C 13/08* (2013.01); *F17C 2201/0109* (2013.01); *F17C 2201/035* (2013.01); *F17C 2205/0107* (2013.01); *F17C 2205/013* (2013.01); *F17C 2205/0305* (2013.01)

(58) Field of Classification Search
CPC .............. F17C 13/08; F17C 2201/0109; F17C 2201/035; F17C 2205/0107; F17C 2205/013; F17C 2205/0305
See application file for complete search history.

(56) References Cited

U.S. PATENT DOCUMENTS 2,761,397 A * 9/1956 Holst ...................... B60P 3/055 280/837
3,479,043 A * 11/1969 Piehl ..................... F17C 13/085 280/830
5,515,997 A 5/1996 Krik et al.
(Continued)

FOREIGN PATENT DOCUMENTS

CN 109630864 A 4/2019
CN 210285433 U 4/2020
(Continued)

OTHER PUBLICATIONS

International Search Report for International Application No. PCT/US2024/027628, date of mailing Aug. 8, 2024, 6 pages.
(Continued)

*Primary Examiner* — Anita M King
(74) *Attorney, Agent, or Firm* — Mai D. Lauer; Westman, Champlin & Koehler, P.A.

(57) ABSTRACT

An assembly is configured for use in a module that is configured to hold a plurality of vessels, at least one of the plurality of vessels including a neck. The assembly includes a bracket and a mounting ring. The bracket has an opening and includes a plate and a collar. The plate has a fixed position along the longitudinal axis, and the collar extends from the plate. The mounting ring includes a second aperture configured to surround the neck, and the mounting ring comprises an outer surface configured to move within the opening along the longitudinal axis. In another aspect, a module is configured for attachment to a plurality of pressure vessels and includes a frame and a bracket. A method is described for supporting a pressure vessel.

20 Claims, 10 Drawing Sheets

(56) References Cited

U.S. PATENT DOCUMENTS

| | | | | |
|---|---|---|---|---|
| 6,986,490 | B2 | 1/2006 | Eihusen et al. | |
| 8,056,928 | B2 | 11/2011 | Ijaz et al. | |
| 9,821,653 | B2 | 11/2017 | Stahl | |
| 10,458,599 | B2 | 10/2019 | Baune et al. | |
| 10,525,824 | B2 | 1/2020 | Kataoka et al. | |
| 10,717,356 | B2 * | 7/2020 | Kataoka | B60K 15/07 |
| 10,760,741 | B2 | 9/2020 | Moutray et al. | |
| 12,024,012 | B2 | 7/2024 | Mair et al. | |
| 2004/0056164 | A1 | 3/2004 | Eihusen et al. | |
| 2009/0184517 | A1 | 7/2009 | Mukai | |
| 2021/0237562 | A1 | 8/2021 | Sawai | |
| 2021/0268897 | A1 | 9/2021 | Mair et al. | |
| 2022/0082212 | A1 | 3/2022 | Woo | |
| 2022/0410700 | A1 | 12/2022 | Cederberg et al. | |
| 2023/0091244 | A1 | 3/2023 | Tufail et al. | |
| 2024/0191843 | A1 | 6/2024 | Baer | |

FOREIGN PATENT DOCUMENTS

| | | | |
|---|---|---|---|
| CN | 211649791 | U | 10/2020 |
| DE | 102012011612 | A1 | 1/2013 |
| DE | 102015009032 | A1 | 1/2017 |
| DE | 102017001370 | A1 | 8/2018 |
| DE | 102017010053 | A1 | 5/2019 |
| DE | 102018116423 | A1 | 1/2020 |
| DE | 102017006715 | B4 | 3/2020 |
| DE | 102019202895 | B4 | 8/2021 |
| DE | 102020124252 | A1 | 3/2022 |
| DE | 102014206370 | B4 | 5/2022 |
| DE | 102021109703 | A1 | 10/2022 |
| EP | 3071874 | B1 | 6/2017 |
| EP | 1262710 | A2 | 12/2022 |
| JP | 5718583 | B2 | 5/2015 |
| WO | 2017145058 | A2 | 8/2017 |
| WO | 2022166304 | A1 | 8/2022 |
| WO | 2022167629 | A1 | 8/2022 |
| WO | 2023006554 | A1 | 2/2023 |

OTHER PUBLICATIONS

Written Opinion of the International Search Report for International Application No. PCT/US2024/027628, date of mailing Aug. 8, 2024, 13 pages.

* cited by examiner

SLIDING VESSEL MOUNT

CROSS-REFERENCE TO RELATED APPLICATION

This application claims the benefit of priority from U.S. provisional patent application No. 63/508,325 filed Jun. 15, 2023, the content of which is hereby incorporated by reference in its entirety.

BACKGROUND

The present disclosure relates generally to fluid storage, and specifically to a mounting system for one or more fluid containment vessels and a method for mounting the fluid containment vessel(s) using the system. A particularly suitable fluid container is a pressure vessel. A typical pressure vessel includes a load bearing outer shell and a fluid impermeable inner liner.

Suitable pressure vessel shell materials include metals, such as steel; or composites, which may include laminated layers of wound fiberglass filaments or other synthetic fibers or filaments bonded together by a binder such as a thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance for the particular application in which the vessel is to be used. Details relevant to the formation of an exemplary pressure vessel are disclosed in U.S. Pat. No. 4,838,971, entitled "Filament Winding Process and Apparatus," which is incorporated herein by reference.

An elastomeric or other non-metal resilient liner or bladder often is disposed within a load-bearing shell to seal the vessel and prevent internal fluids from contacting the composite shell material. A polymeric liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, the liner is formed of blow molded high density polyethylene (HDPE).

The composite construction of the vessels provides numerous advantages such as lightness in weight and resistance to corrosion, fatigue and catastrophic failure. These attributes are due at least in part to the high specific strengths of the reinforcing fibers or filaments. Such composite vessels are commonly used for containing a variety of fluids under pressure, such as hydrogen, oxygen, natural gas, nitrogen, methane, propane, and rocket or other fuel, for example. Generally, pressure vessels can be of any size or configuration. The vessels can be heavy or light, single-use (i.e., disposable), reusable, subjected to high pressures (greater than 50 pounds per square inch (psi), for example), low pressures (less than 50 psi, for example), or used for storing fluids at elevated or cryogenic temperatures, for example. Descriptions relevant to pressure vessels are presented in U.S. Pat. No. 5,476,189, entitled "Pressure vessel with damage mitigating system," which is hereby incorporated by reference.

Composite pressure vessels of the character described above originally were developed for aircraft and aerospace applications primarily because of the critical weight restrictions in such vehicles. As compressed natural gas (CNG) has become more widely used in ground-based vehicles such as buses and cars, the composite pressure vessel has become more widely used. A generally cylindrical shape having rounded or domed ends is a highly-desirable form factor from a standpoint of both strength and packing efficiency. However, the rounded shape can make securing such a pressure vessel to a vehicle difficult.

The neck of the compressed gas cylinder provides a structural protrusion suitable for attachment by a collar or similar device. Certain known designs make use of this feature to secure a gas cylinder. However, such designs suffer from a number of drawbacks. Some designs handle vessel expansion, contraction, movement, and misalignment poorly and can place substantial stresses on the neck structure. Other designs inadequately secure the neck, so that there is a risk that the cylinder may detach from the mount under certain conditions, thereby placing stress on connection lines or other attached hardware.

SUMMARY

In one aspect, an assembly is configured for use in a module that is configured to hold a plurality of vessels, at least one of the plurality of vessels comprising a neck and having a longitudinal axis. The assembly comprises a bracket and a mounting ring. The bracket has an opening and comprises a plate and a collar. The plate has a fixed position along the longitudinal axis, and the collar extends from the plate. The mounting ring comprises a second aperture configured to surround the neck, and the mounting ring comprises an outer surface configured to move within the opening along the longitudinal axis.

In another aspect, a module is configured for attachment to a plurality of pressure vessels, at least one of the plurality of pressure vessels comprising a neck and having a longitudinal axis. The module comprises a frame and a bracket. The frame comprises a plurality of first apertures, wherein at least one of the plurality of first apertures is configured for passage of the neck therethrough. The bracket has an opening and comprises a plate and a collar. The plate is attached to the frame, and the collar extends from the plate. The mounting ring comprises a second aperture configured to surround the neck, and the mounting ring comprises a cylindrical surface configured to move within the opening along the longitudinal axis.

In yet another aspect, a method is described for supporting a pressure vessel comprising a neck and having a longitudinal axis. The method comprises passing the neck through a first aperture of a frame; joining first and second portions of a mounting ring around the neck, wherein the mounting ring is axially fixed on the neck; sliding an opening of a bracket on an outer surface of the mounting ring; and attaching the bracket to the frame.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

In FIG. 12, the mounting rings of adjacent vessels are connected with bridges.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise. Descriptions of parts also apply to similarly numbered parts unless otherwise stated.

DETAILED DESCRIPTION

U.S. Pat. No. 6,986,490 by Eihusen et al., entitled "Method and apparatus for mounting a fluid containment cylinder," which is hereby fully incorporated by reference, describes a prior art vessel securement method and apparatus that provides for securely fastening a pressure vessel against axial and rotational movement while enabling the pressure vessel mounting structures to accommodate a degree of misalignment without unduly stressing the neck of the pressure vessel. Eihusen's prior art cylinder and frame assembly includes a spherical bearing disposed around the outer surface of a neck of a boss of a pressure vessel or cylinder. A boss may be such as that disclosed in U.S. Pat. No. 5,429,845, entitled "Boss for a filament wound pressure vessel," which is hereby incorporated by reference. However, pressure vessels are often mounted in locations having limited space, such as in vehicles. In such locations, the extended neck, frame, bearing and securing collar use valuable space, particularly in a length dimension (along a longitudinal axis of the pressure vessel).

Figure 1:
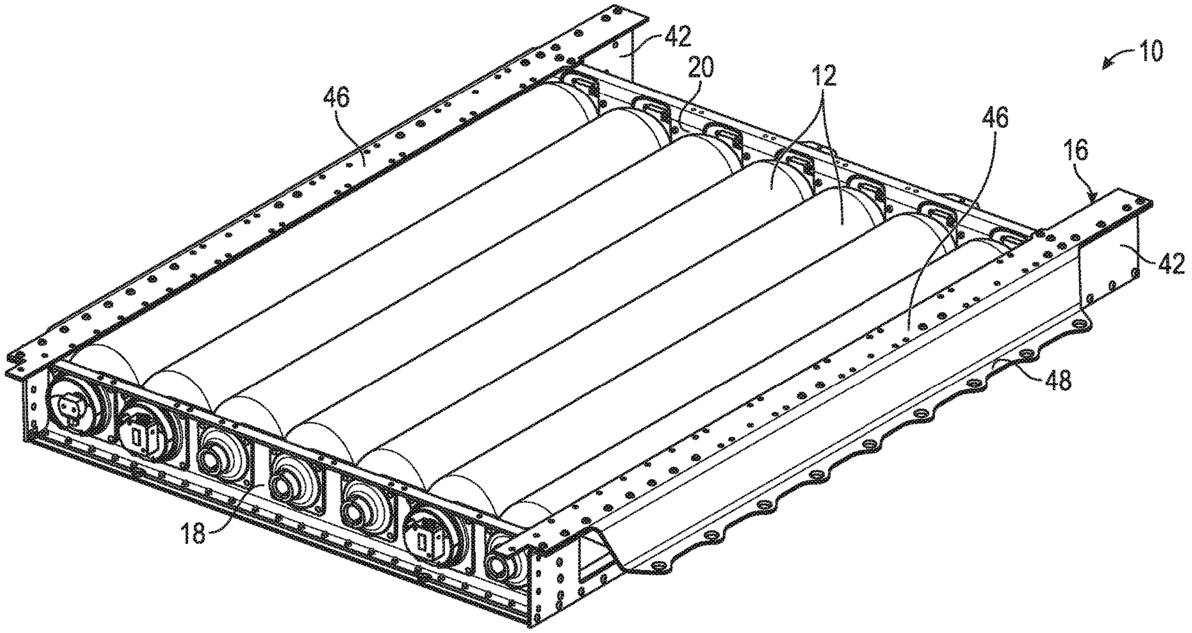
FIG. 1 is a perspective view of an exemplary embodiment of a gas storage module.

FIG. 1 shows a mounting system or module 10 for a plurality of pressure vessels 12. Each pressure vessel 12 has a boss 14 (see FIGS. 6-8, 10 and 11) at least on one end of the pressure vessel 12, to allow for insertion of a valve element such as armature 15 (a variation is labeled 15') to permit gas to flow into and out of the pressure vessel 12. In an exemplary embodiment, each boss 14 has a short neck 40 that sticks outward from the body of the pressure vessel 12 (along its length) and can be used with the mounting structures of system 10. Mounting frame assembly 16 includes front wall 18 and rear wall 20. In an exemplary embodiment, each of the front and rear walls 18, 20 includes a plurality of holes 22 (a variation is labeled 22'), wherein each hole 22 is configured to fit around the domed end portion 62 of the pressure vessel 12 without contact between the pressure vessel 12 and the front or rear wall 18, 20. A wall need not have a continuous surface and can be any support having one or more surfaces to which the described mounts can be attached. In an exemplary embodiment, the support is substantially planar and oriented generally perpendicular to a longitudinal axis of a pressure vessel 12.

Two specific embodiments of an armature and of an aperture are illustrated, and in some cases they will be differentiated by referring to the first embodiments with reference numbers 15, 22 and the second embodiments with reference to numbers 15', 22'. However, in many aspects, the parts are similar; descriptions of an armature or aperture apply to all embodiments unless otherwise specified. This convention also applies to other similarly numbered elements.

In an exemplary embodiment, mounting frame assembly 16 also includes side walls 42, each of which has an open truss construction for lightweight rigidity. In an exemplary embodiment, an upper attachment flange 46 and a lower flange 48 are connected to each of the side walls 42. The upper and lower flanges 46, 48 provide horizontal surfaces with attachment features, such as fastener apertures, and are configured to allow mounting frame assembly 16 to be secured to a structure such as a vehicle frame, for example. The upper flange 46 also lends rigidity to the mounting frame assembly 16 by mechanically connecting the vertical walls 18, 20, 42.

Figure 2:
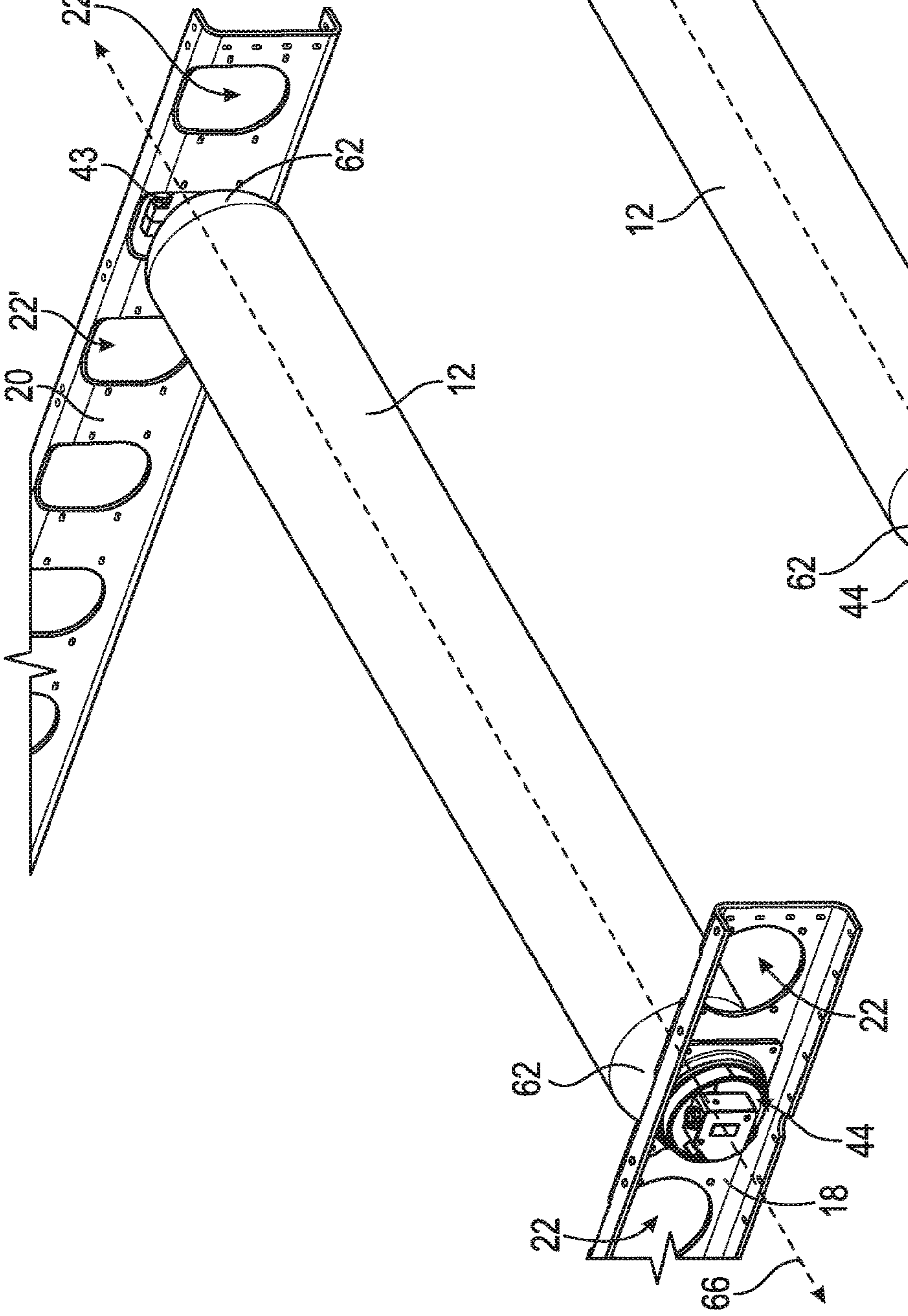
FIG. 2 is a perspective view of a single gas storage vessel attached to frame members of the gas storage module at opposite ends of the vessel.

FIG. 2 is a perspective view of a single pressure vessel 12 attached to front wall 18 and rear wall 20. In the illustrated embodiments, a fixed mount 43 is used to attach a rear boss 14 of the pressure vessel 12 to rear wall 20. In contrast, a floating or sliding mount 44 is configured to attach a boss 14 at a front domed end 62 of pressure vessel 12 to front wall 18.

Figure 3:
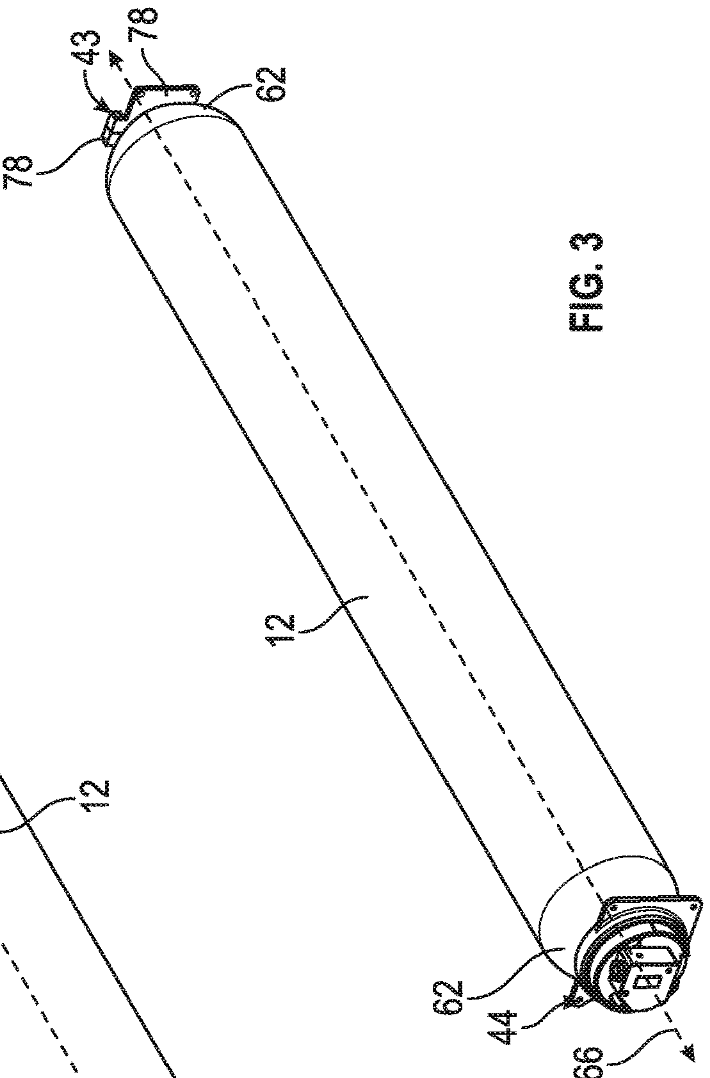
FIG. 3 is a perspective view of an exemplary gas storage tank with vessel mounts attached thereto; the module frame members are not shown in this view.

FIG. 3 shows a single pressure vessel 12 removed from the mounting frame assembly 16, but with the fixed mount 43 and sliding mount 44 attached to ends thereof. In an actual implementation of pressure vessel 12 in a vehicle, an assembly is shown in FIG. 3 would not generally occur, as domed ends of the pressure vessel 12 would be inserted into the mounting frame assembly 16 at holes 22 before the mounts 43, 44 are assembled onto the pressure vessel 12 and onto the mounting frame assembly 16. However, the mounting frame assembly 16 is removed from FIG. 3 so that structures of the mounts 43, 44 are more clearly visible.

Figure 4:
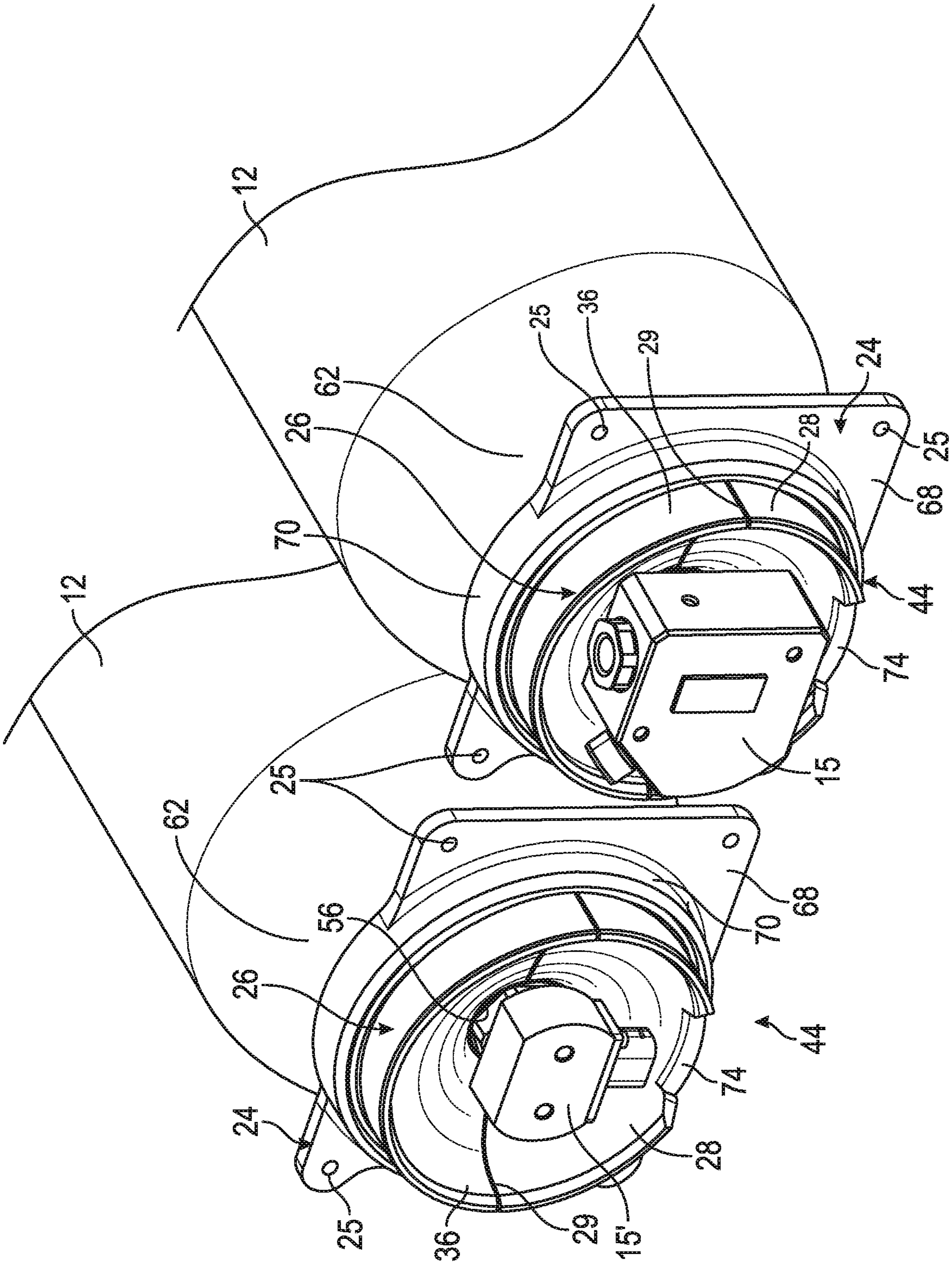
FIG. 4 is a partial perspective view of sliding vessel mounts attached to two pressure vessels having different armature units thereon.

FIG. 4 is a partial perspective view of two adjacent pressure vessels 12 having sliding mounts 44 attached thereto and exhibiting different configurations of armatures 15, 15'. For each pressure vessel 12, sliding mount 44 includes a bracket 24 configured for attachment to a support such as front wall 18, such as with fasteners through aligned apertures 25. For purposes of discussion, a side of sliding mount 44 facing armature 15, 15' is considered to be the "exterior" side, and a side of the sliding mount 44 facing the domed end 62 of pressure vessel 12 is considered to be the "interior" side. While FIG. 4 illustrates a separate bracket 24 for each pressure vessel 12, in another embodiment, a single bracket 24 may have a plate 68 that spans across two or more pressure vessels 12. Referring to FIG. 1, it is possible that a single bracket 24, having a single plate 68 with multiple collars 70 (one collar 70 corresponding to each pressure vessel 12), could be attached to wall 18. In yet another embodiment, the single bracket 24 spanning all pressure vessels 12 of mounting system 10 could serve as the front wall and be directly attached to side walls 42 and upper flange 46.

Figure 5:
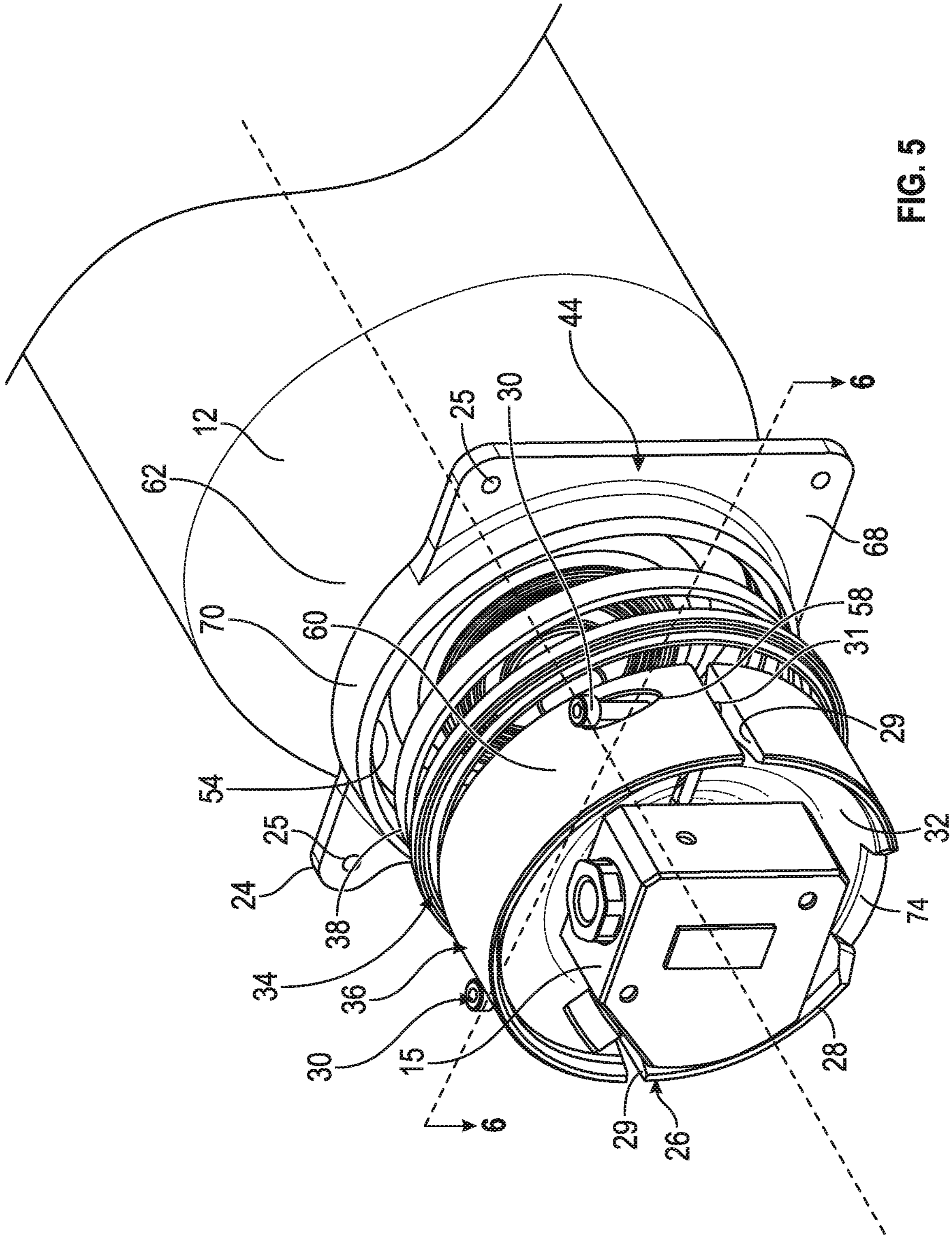
FIG. 5 is an exploded perspective view of one of the pressure vessel bearing mount assemblies of FIG. 4.
Figure 6:
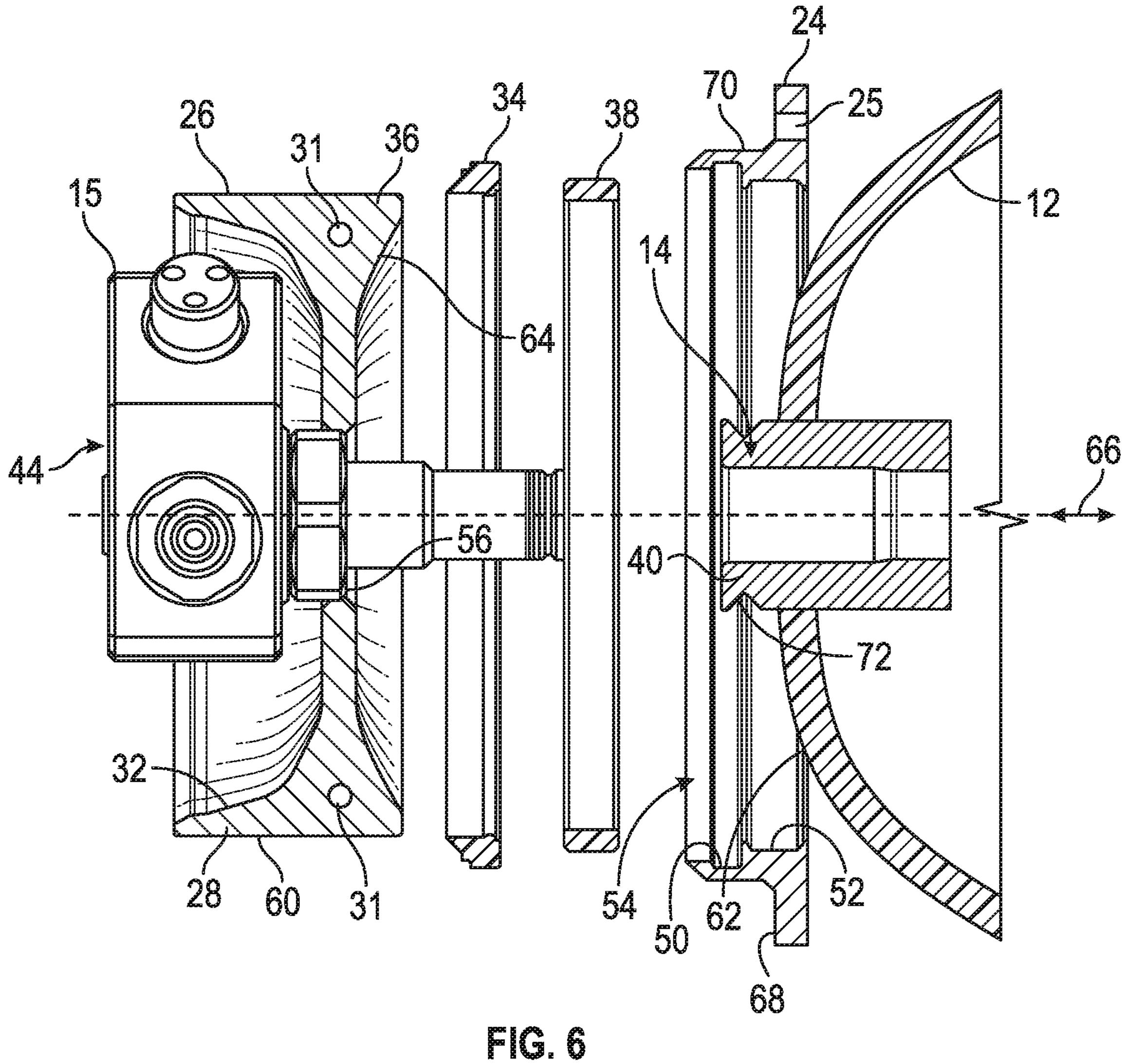
FIG. 6 is a partial cross-sectional view, taken along line 6-6 of FIG. 5.

As shown more fully in FIG. 5, mounting ring 26 has a lower shell 28 and an upper shell 36 for receiving the neck 40 of boss 14. In an exemplary embodiment, lower shell 28 and upper shell 36 are fastened together at joint 29 by fasteners such as shoulder bolts 30 through apertures 31. In an exemplary embodiment as shown in FIG. 6, an exterior side of mounting ring 26 includes a significant recess 32 that is configured to surround armatures 15 of various sizes and shapes. In an exemplary embodiment, an assembled mounting ring 26 includes aperture 56 configured to fit about neck 40 of boss 14 and allow passage of components of armature 15 therethrough. In an exemplary embodiment, at least one of lower shell 28 or upper shell 36 has a notch 74 cut into the end to allow access to components of armature 15', as shown on a left side of FIG. 4.

As shown in FIGS. 5-8, scraper ring 34 is configured to surround an outer surface 60 of mounting ring 26, which is formed from the assembled lower shell 28 and upper shell 36. In an exemplary embodiment, scraper ring 34 is resilient in structure and/or material. Suitable materials include but are not limited to rubber, silicone, cork, neoprene, nitrile rubber, fiberglass, polytetrafluoroethylene (PTFE), a thermoplastic elastomer, other plastic, or any combination thereof. In some cases, scraper ring 34 can be formed of a relatively stiff material such as metal; resilience or compressibility can be provided in the form of a biasing member such as a spring, for example. In an exemplary embodiment, scraper ring 34 is mounted in a recess 50 in bracket 24, and slide ring 38 is mounted in the recess 52 of bracket 24. Slide ring 38 is a bearing ring, and together with scraper ring 34, these elements allow an outer surface 60 of mounting ring 26 to move axially (in linear directions 66) within opening 54 in bracket 24. A function of scraper ring 34 is to exclude matter such as dirt, grit and other contaminants from the interface between an outer surface 60 of mounting ring 26 and an inner surface of the slide ring 38. Scraper ring 34 and slide ring 38 may be retained in their respective recesses 50, 52 in bracket 24 by suitable means including adhesive, for example.

Figure 7:
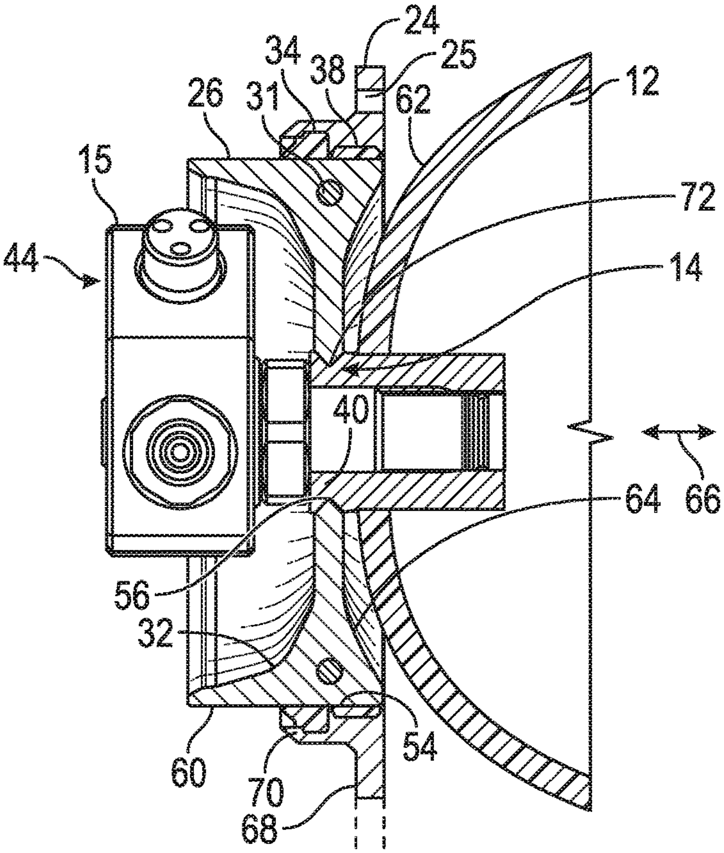
FIG. 7 is similar to FIG. 6 but shows the components of the sliding bearing mount assembled together, and in a first configuration, wherein the length of the pressure vessel is near its maximum.
Figure 8:
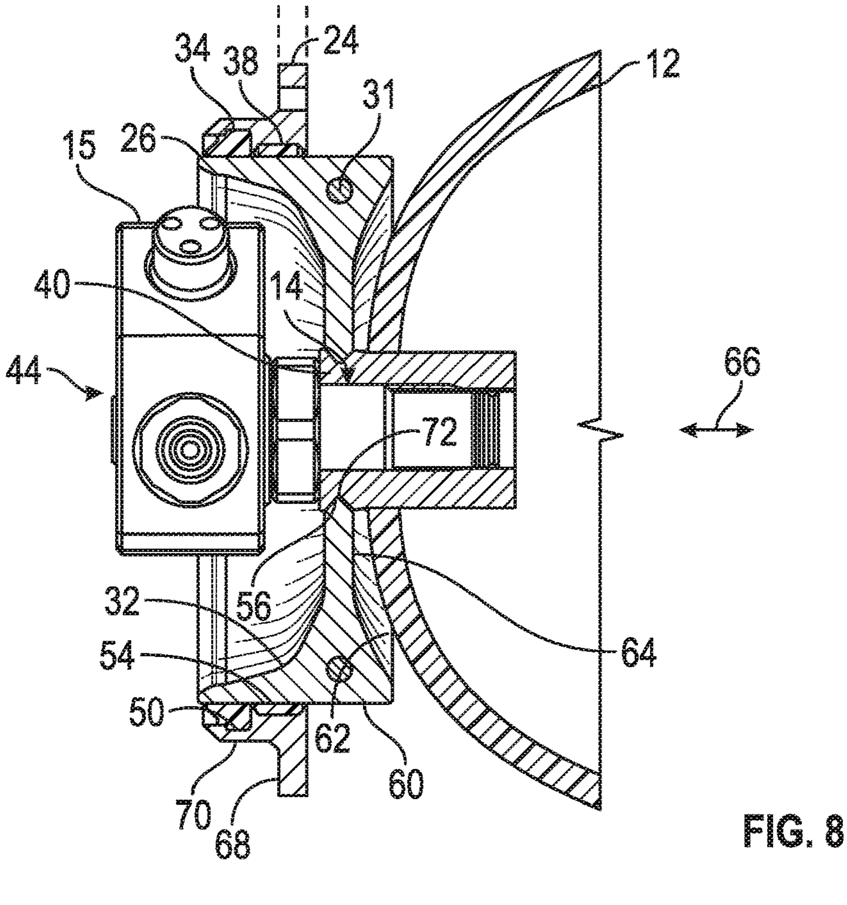
FIG. 8 is similar to FIG. 7 but shows the sliding bearing mount in a second configuration, wherein the pressure vessel is near its minimum length.

FIGS. 7 and 8 each show top, partial cross-sectional views of a pressure vessel 12 held in a sliding mount 44. In both of these views, the bracket 24 is at a common axial position. In FIG. 7, pressure vessel 12 is near its maximum length at the depicted end 62 of the pressure vessel 12, so that the mounting ring 26 connected at its aperture 56 to neck 40 of boss 14 is displaced to the left as illustrated, relative to the bracket 24 (which has scraper ring 34 and slide ring 38 held within its opening 54). As shown in FIG. 8, when an axial length of pressure vessel 12 is near its minimum, the mounting ring 26 is displaced toward the right of the drawing as illustrated, relative to the fixed position of bracket 24 on a wall 18, 20 of the mounting frame assembly 16. In exemplary embodiments, a range of motion of mounting ring 26 relative to mounting bracket 24 in axial linear directions 66 is between about 8 mm and about 16 mm; a motion range of about 12 mm is particularly suitable for some popular sizes of pressure vessels 12 used in passenger vehicles. However, the disclosed concepts can be practiced with other dimensions.

Figure 9:
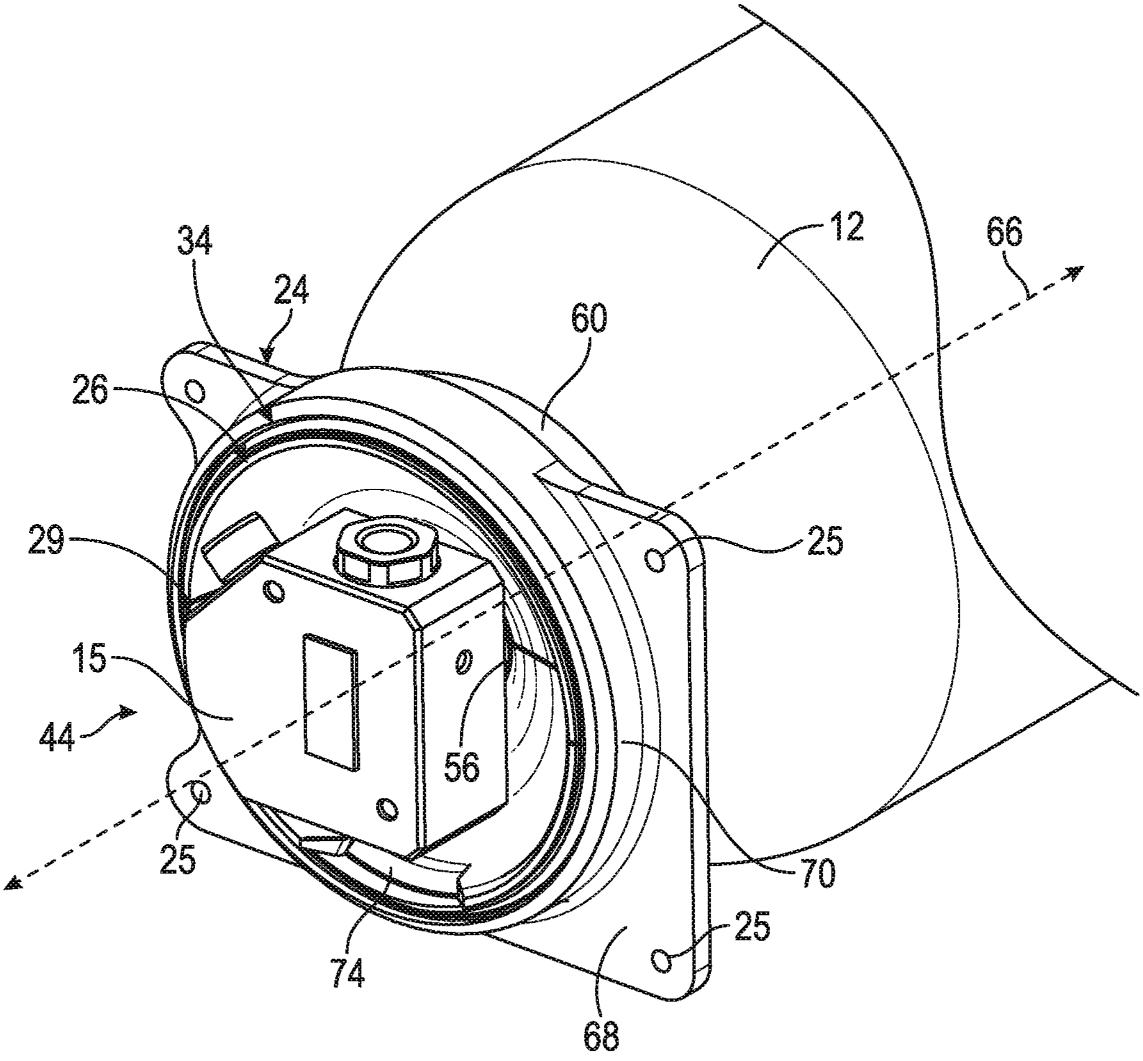
FIG. 9 is a perspective view of the pressure vessel with an exemplary sliding bearing mount attached thereto, and in the second configuration, wherein the pressure vessel is near its minimum length.
Figure 10:
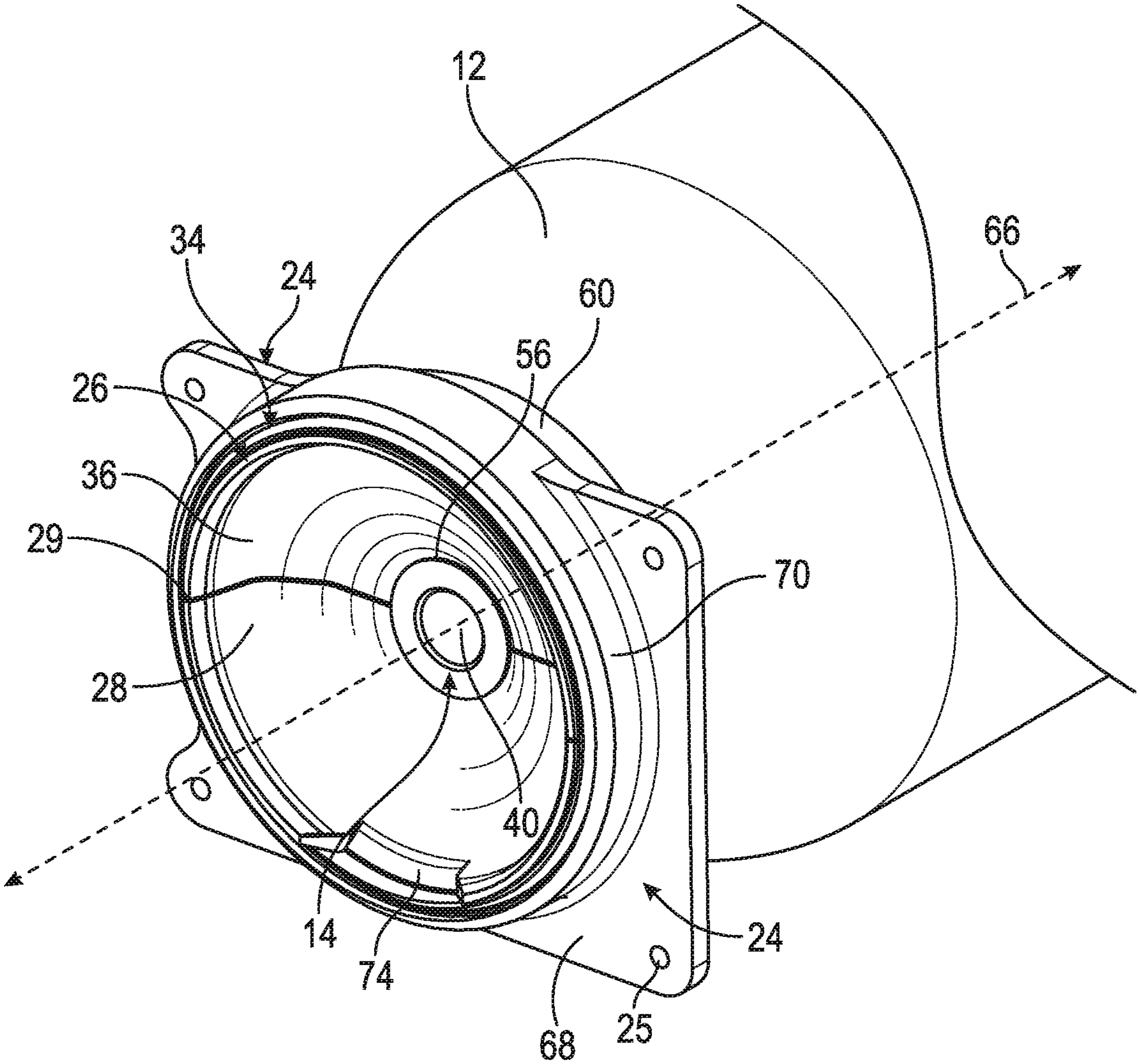
FIG. 10 is similar to FIG. 9 but omits the armature.
Figure 11:
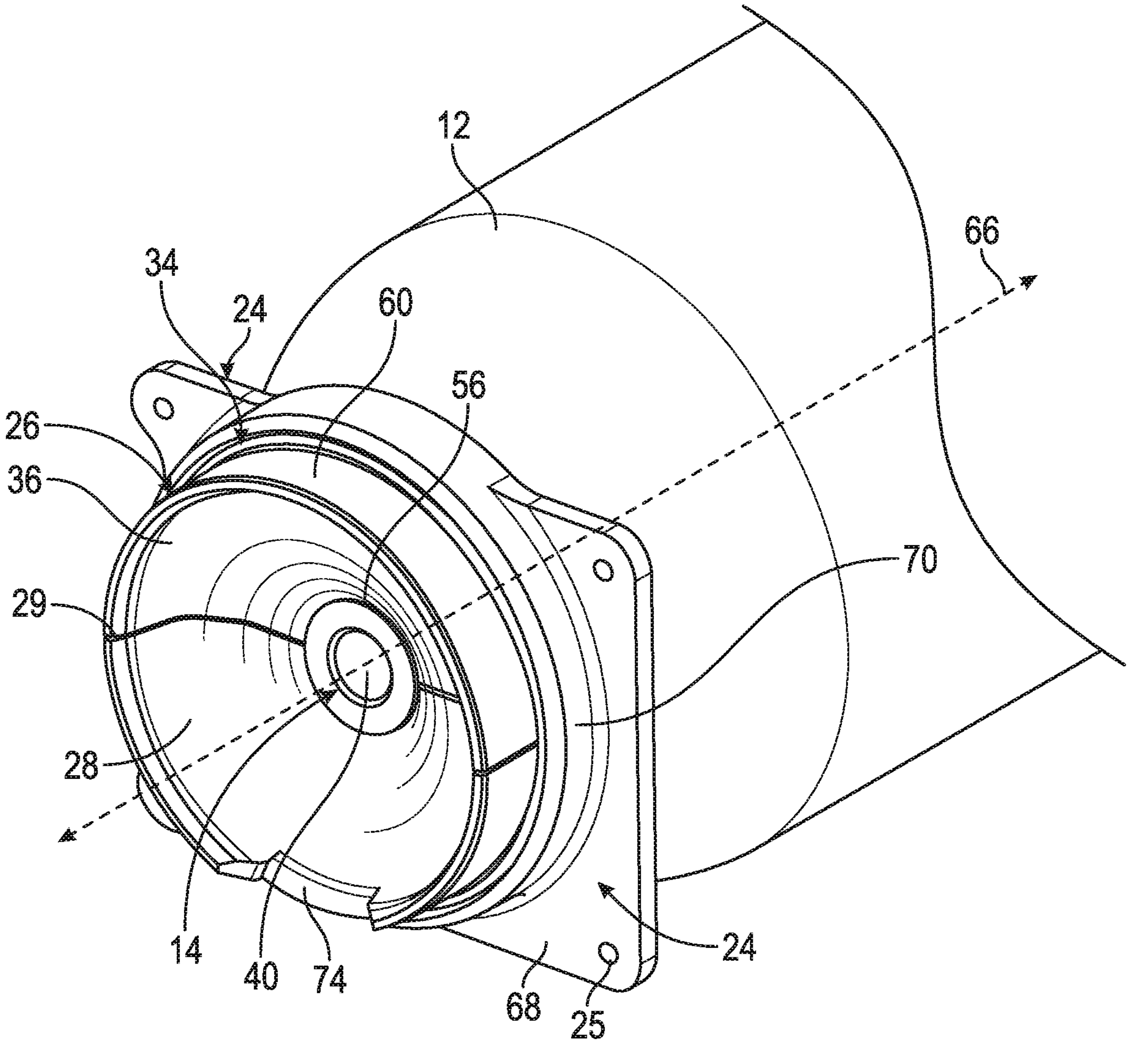
FIG. 11 is similar to FIG. 10 but shows the sliding bearing mount in a first configuration, wherein the pressure vessel is near its maximum length.

FIG. 9 is an exterior perspective view of the components of FIG. 8 in this second configuration, wherein the pressure vessel 12 is near its minimum length. FIG. 10 is similar to FIG. 9, showing the pressure vessel and sliding mount 44 in the second configuration, wherein the pressure vessel is near its minimum length, and wherein the armature has been removed for a better view of the components of the sliding mount 44. FIG. 11 is similar to FIG. 10 but shows the pressure vessel 12 near its maximum length, wherein the mounting ring 26 is extended leftward from the bracket 24 in a first configuration (also depicted in FIG. 7).

In an exemplary embodiment, slide ring 38 serves as an annular bearing that provides some resilience to deformation to accommodate for slight axial misalignment of mounting ring 26 within opening 54 of bracket 24. Suitable materials for slide ring 38 include, without limitation, polytetrafluoroethylene (PTFE) compounded with carbon and optional graphite; glass fiber reinforced polyacetal resins, and other compounds, particularly those with properties as listed in Table 1.

TABLE 1

| Property | Conditions | Unit | Value range | Chosen value |
|---|---|---|---|---|
| Minimum Tensile Strength | 23° C | Mpa | 12-100 | 25 |
| Specific Gravity | 23° C. | g/cm$^3$ | 1.25-2.5 | 2 |
| Temperature Range | — | ° C. | −60-+200 | −40-+85 |
| Ball Indentation Hardness | 23° C. | MPa | 34-100 | 40 |

TABLE 1-continued

| Property | Conditions | Unit | Value range | Chosen value |
|---|---|---|---|---|
| Maximum Speed | 23° C. | m/s | 15 | 1 |
| Linear Expansion | −75° C.-125° C. | mm/mm/K | 9E−5-4E−4 | 1E−4 |

In an exemplary embodiment, scraper ring 34, being formed of a compressible material, additionally offers vibration control and motion deflection performance. Moreover, freedom of motion in mounting system 10 to external structures can also be achieved by using flexible and resilient fasteners 80 at apertures 25 in bracket 24 for connection to walls 18, 20 of mounting frame assembly, for example (see FIG. 12). Additionally or alternatively, mounting system 10 can be mounted to flexible or resilient external structures (not shown).

As shown in FIGS. 7 and 8, the neck 40 of boss 14 is secured in the system 10 at aperture 56 of mounting ring 26, formed by connecting lower shell 28 and upper shell 36 by bolts 30 through apertures 31. In an exemplary embodiment, a ridge is disposed at aperture 56 to be received into a corresponding groove 72 in neck 40. As shown in FIG. 5, recess 58 is provided in outer surface 60 of mounting ring 26 at upper cradle 36 so that the heads of bolts 30 are recessed below the outer surface 60. Thus, as shown in FIGS. 7 and 8, an entire length of the outer surface 60 of mounting ring 26 can slide back and forth in axial directions 66 as the length of pressure vessel 12 changes, such as due to expansion of compressed gas within the pressure vessel. Once the lower shell 28 and upper shell 36 are connected together, the mounting ring 26 is axially fixed to neck 40 and moves therewith. In an exemplary embodiment, a side of mounting ring 26 that faces a domed end 62 of pressure vessel 12 includes recess 64 to fit around the domed end 62 of pressure vessel 12. Thus, a portion of the bearing surface 60 of mounting ring 26 extends to the right as illustrated, relative to the neck mounting aperture 56 of mounting ring 26. In an alternative structure, mounting ring 26 is not formed with connecting shells 28, 36 but may instead be formed integrally with boss 14. The described configurations make effective use of the space extending in the axial directions 66 at an end 62 of the pressure vessel 12.

On an exterior facing side of mounting ring 26, recess 32 similarly surrounds and accommodates the dimensions of armature 15. In an exemplary embodiment, mounting ring 26 of sliding mount 44 has a diameter that is able to accommodate armature 15, 15' of various configurations but is not significantly larger than required for that function, so that its exterior dimensions are minimized, thereby allowing space between adjacent sliding mounts 44 for other structures to which the pressure vessels 12 may be connected, such as regulators and other devices.

Figure 12:
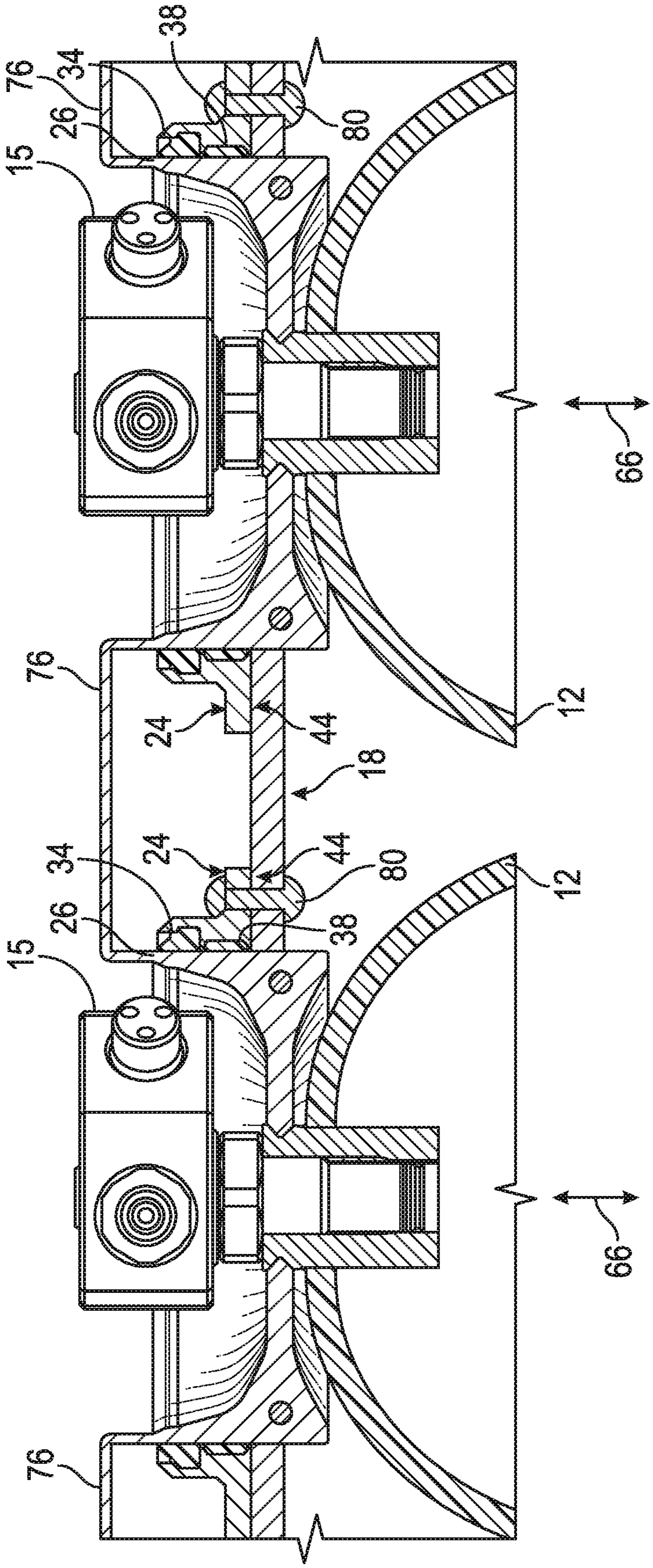
FIG. 12 is similar to FIGS. 7 and 8 in illustrating two pressure vessels side-by-side.

FIG. 12 is similar to FIGS. 7 and 8 in illustrating two pressure vessels 12 positioned side-by-side. In FIG. 12, the mounting rings 26 of adjacent vessels 12 are connected with bridges 76 across multiple vessels 12. In one embodiment, bridges 76 are rigid, so that when one or more vessels 12 expand, all of the ends of connected vessels 12 are pulled to a common position along axial direction 66. In another embodiment, bridges 76 are formed of a deformable material such as a thin metal sheet, spring plate or plastic compound. Thus, the sliding part of sliding mount 44 can be provided as a single part, though it is able to accommodate differential expansion of the connected vessels 12.

In exemplary embodiments, a length of the components of the sliding mount 44 does not extend beyond an inherent length of a pressure vessel 12 with an armature 15 attached therethrough (in the axial directions 66). Thus, this disclosure describes a compact sliding mount 44 that allows for axial expansion of a length of a pressure vessel and some accommodation of forces in other directions. In an exemplary embodiment, bracket 24 includes an attachment plate 68 through which attachment apertures 25 are provided. In an exemplary embodiment, the attachment plate 68 has a substantially rectangular configuration, though other shapes can also be used. In an exemplary embodiment, a cylindrical collar 70 extends exteriorly from the plate 68 to an axial extent that is sufficient to accommodate a stacked arrangement of scraper ring 34 and slide ring 38.

As a length of pressure vessel 12 changes due to expansion of compressed gas within the pressure vessel, mounting ring 26 slides within bracket 24 in linear directions 66 along the longitudinal axis of pressure vessel 12. Slight tilting motions of the pressure vessel 12 at boss 14 are accommodated by the resilience of scraper ring 34 and slide ring 38 in contact with the exterior surface 60 of mounting ring 26.

FIG. 3 shows the attachment of an opposite boss 14 at rear wall 20. The rear boss 14 is fixed to rear wall 20 by mirror image left and right plates 78, which are secured around boss neck 40 by bolts. In an exemplary embodiment, each of the left and right plates forms a semicircular frame around neck 40 of boss 14. However, deviations from this illustrated configuration can be used. In an exemplary embodiment, sliding motions of the domed end 62 of the pressure vessel 12 are not accommodated at rear wall 20—only at front wall 18. However, in another embodiment, the components of sliding mount 44 at front wall 18 can be duplicated at rear wall 20 to further facilitate such axial motions of the pressure vessel.

Non-limiting examples of an assembly, module, and method of use are described. An exemplary assembly 44 is configured for use in a module 10 that is configured to hold a plurality of vessels 12, at least one of the plurality of vessels 12 comprising a neck 40 and having a longitudinal axis. The module 10 comprises a wall 18, 20 comprising a plurality of first apertures 22, wherein at least one of the plurality of first apertures 22 is configured for passage of the neck 40 therethrough. In an exemplary embodiment, the assembly 44 comprises a bracket 24 and a mounting ring 26. In an exemplary embodiment, the bracket 24 has an opening 54 and comprises a plate 68 configured for attachment to the wall 18, 20 and a collar 70 extending from the plate 68. In an exemplary embodiment, the mounting ring 26 comprises a second aperture 56 configured to surround the neck 40. In an exemplary embodiment, the mounting ring 26 comprises an outer surface 60 configured to move within the opening 54 along the longitudinal axis in directions 66.

In an exemplary embodiment, the mounting ring 26 comprises a first recess 32 configured to surround an armature 15 attached to the neck 40. In an exemplary embodiment, the mounting ring comprises a second recess 64 configured to surround a domed end 62 of the at least one of the plurality of vessels 12. In an exemplary embodiment as shown in FIG. 5, the mounting ring comprises a first section 28 and a second section 36 connected at a joint 29. In an exemplary embodiment as shown in FIGS. 6-8, a slide ring 38 is received in a first recess 52 of the bracket 24 at the opening 54. In an exemplary embodiment, a scraper ring 34 is received in a second recess 50 of the bracket 24 at the opening 54. In an exemplary embodiment, the slide ring 38 is positioned closer to, and the scraper ring 34 is positioned farther from, a domed end 62 of the at least one of the plurality of vessels 12. In an exemplary embodiment, the mounting ring 26 comprises a ridge at the second aperture 56 configured for insertion into a groove 72 of the neck 40.

An exemplary module 10 is configured for attachment to a plurality of pressure vessels 12, at least one of the plurality of pressure vessels 12 comprising a neck 40 and having a longitudinal axis. In an exemplary embodiment, the module 10 comprises a frame 16, a bracket 24 and a mounting ring 26. In an exemplary embodiment, the frame 16 comprises a plurality of first apertures 22, wherein at least one of the plurality of first apertures 22 is configured for passage of the neck 40 therethrough. In an exemplary embodiment, the bracket 24 has an opening 54 and comprises a plate 68 and a collar 70. In an exemplary embodiment, the plate 68 is attached to the frame 16 and the collar 70 extends from the plate 68. In an exemplary embodiment, the mounting ring 26 comprises a second aperture 56 configured to surround the neck 40. In an exemplary embodiment, the mounting ring 26 comprises a cylindrical surface 60 configured to move within the opening 54 along the longitudinal axis.

An exemplary method for supporting a pressure vessel 12 is described, wherein the pressure vessel 12 comprises a neck 40 and has a longitudinal axis. An exemplary method comprises passing the neck 40 through a first aperture 22 of a frame 16; joining first and second portions 28, 36 of a mounting ring 26 around the neck 40, wherein the mounting ring 26 is axially fixed on the neck 40; sliding an opening 54 of a bracket 24 on an outer surface 60 of the mounting ring 26; and attaching the bracket 24 to the frame 16.

An exemplary method comprises changing a length of the pressure vessel 12 so that the mounting ring 26 moves axially within the opening 54. In an exemplary method, the bracket 24 comprises an annular bearing 38 disposed at the opening 54, the method including moving the outer surface 60 of the mounting ring 26 against the annular bearing 38. In an exemplary method, the bracket 24 comprises a resilient annulus 34 disposed at the opening 54, the method including moving the outer surface 60 of the mounting ring 26 against the resilient annulus 34.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. An assembly configured for use in a module that is configured to hold a plurality of vessels, at least one of the plurality of vessels comprising a neck and having a longitudinal axis, the assembly comprising:

a bracket having an opening and comprising:

a plate having a fixed position along the longitudinal axis; and a collar extending from the plate; and a mounting ring comprising a second opening configured to surround the neck, the mounting ring comprising an outer surface configured to slide linearly within the opening along the longitudinal axis.

2. The assembly of claim 1, wherein the mounting ring comprises a first recess configured to surround an armature attached to the neck.

3. The assembly of claim 2, wherein the mounting ring comprises a second recess configured to surround a domed end of the at least one of the plurality of vessels.

4. The assembly of claim 1, wherein the mounting ring comprises a first section and a second section connected at a joint.

5. The assembly of claim 1, comprising a slide ring received in a first recess of the bracket at the opening.

6. The assembly of claim 5, comprising a scraper ring received in a second recess of the bracket at the opening.

7. The assembly of claim 6, wherein the slide ring is positioned closer to, and the scraper ring is positioned farther from, a domed end of the at least one of the plurality of vessels.

8. The assembly of claim 1, wherein the mounting ring comprises a ridge at the second opening configured for insertion into a groove of the neck.

9. A module configured for attachment to a plurality of pressure vessels, at least one of the plurality of pressure vessels comprising a neck and having a longitudinal axis, the module comprising:

a frame comprising a plurality of first apertures, wherein at least one of the plurality of first apertures is configured for passage of the neck therethrough;

a bracket having an opening and comprising:

a plate attached to the frame; and a collar extending from the plate; and a mounting ring comprising a second aperture configured to surround the neck, the mounting ring comprising a cylindrical surface configured to slide linearly within the opening along the longitudinal axis.

10. The module of claim 9, wherein the mounting ring comprises a first recess configured to surround an armature attached to the neck.

11. The module of claim 10, wherein the mounting ring comprises a second recess configured to surround a domed end of the at least one of the plurality of pressure vessels.

12. The module of claim 9, wherein the mounting ring comprises a lower shell and an upper shell connected at a joint.

13. The module of claim 9, comprising a slide ring received in a first recess of the bracket at the opening.

14. The module of claim 13, comprising a scraper ring received in a second recess of the bracket at the opening.

15. The module of claim 14, wherein the slide ring is positioned closer to, and the scraper ring is positioned farther from, a domed end of the at least one of the plurality of pressure vessels.

16. The module of claim 9, wherein a ridge at the second aperture is disposed in a groove of the neck.

17. A method for supporting a pressure vessel comprising a neck and having a longitudinal axis, the method comprising:

passing the neck through a first aperture of a frame;

joining first and second portions of a mounting ring around the neck, wherein the mounting ring is axially fixed on the neck;

linearly sliding an opening of a bracket on an outer surface of the mounting ring along the longitudinal axis; and attaching the bracket to the frame.

18. The method of claim 17, comprising changing a length of the pressure vessel so that the mounting ring moves axially within the opening.

19. The method of claim 18, wherein the bracket comprises an annular bearing disposed at the opening, the method including moving the outer surface of the mounting ring against the annular bearing.

20. The method of claim 18, wherein the bracket comprises a resilient annulus disposed at the opening, the method including moving the outer surface of the mounting ring against the resilient annulus.

* * * * *